Nov. 10, 1953     K. AURBACH ET AL     2,658,668
INDICATING APPARATUS FOR CASH REGISTERS
OR OTHER BUSINESS MACHINES

Filed Oct. 17, 1950     10 Sheets-Sheet 1

Inventors
Kurt Aurbach
Hans Schaper

Nov. 10, 1953     K. AURBACH ET AL     2,658,668
INDICATING APPARATUS FOR CASH REGISTERS
OR OTHER BUSINESS MACHINES
Filed Oct. 17, 1950     10 Sheets-Sheet 4
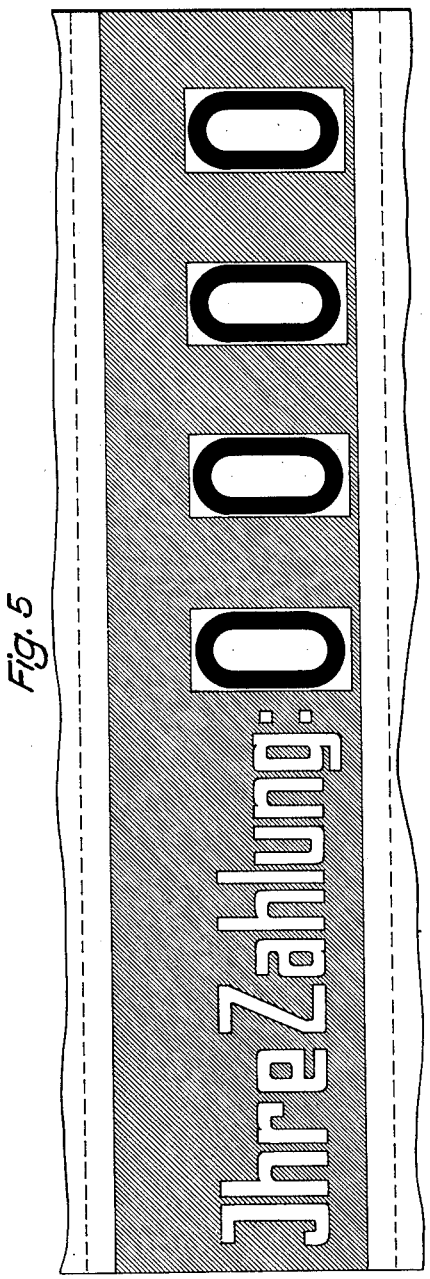
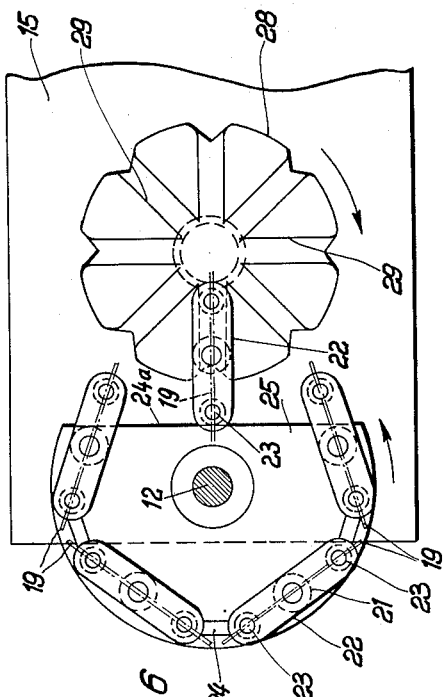
Inventors:
Kurt Aurbach
Hans Schaper Nov. 10, 1953 K. AURBACH ET AL 2,658,668
INDICATING APPARATUS FOR CASH REGISTERS
OR OTHER BUSINESS MACHINES
Filed Oct. 17, 1950 10 Sheets-Sheet 5
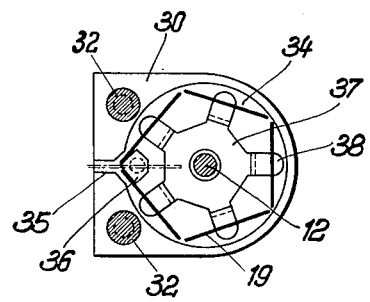
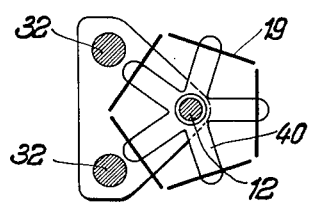
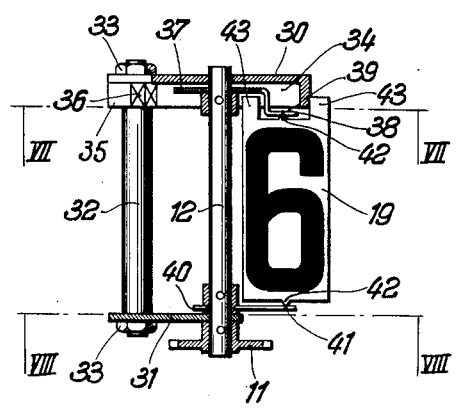
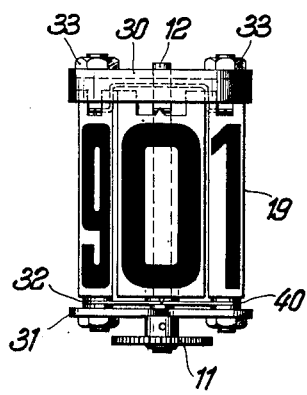
Inventors
Kurt Aurbach
Hans Schaper

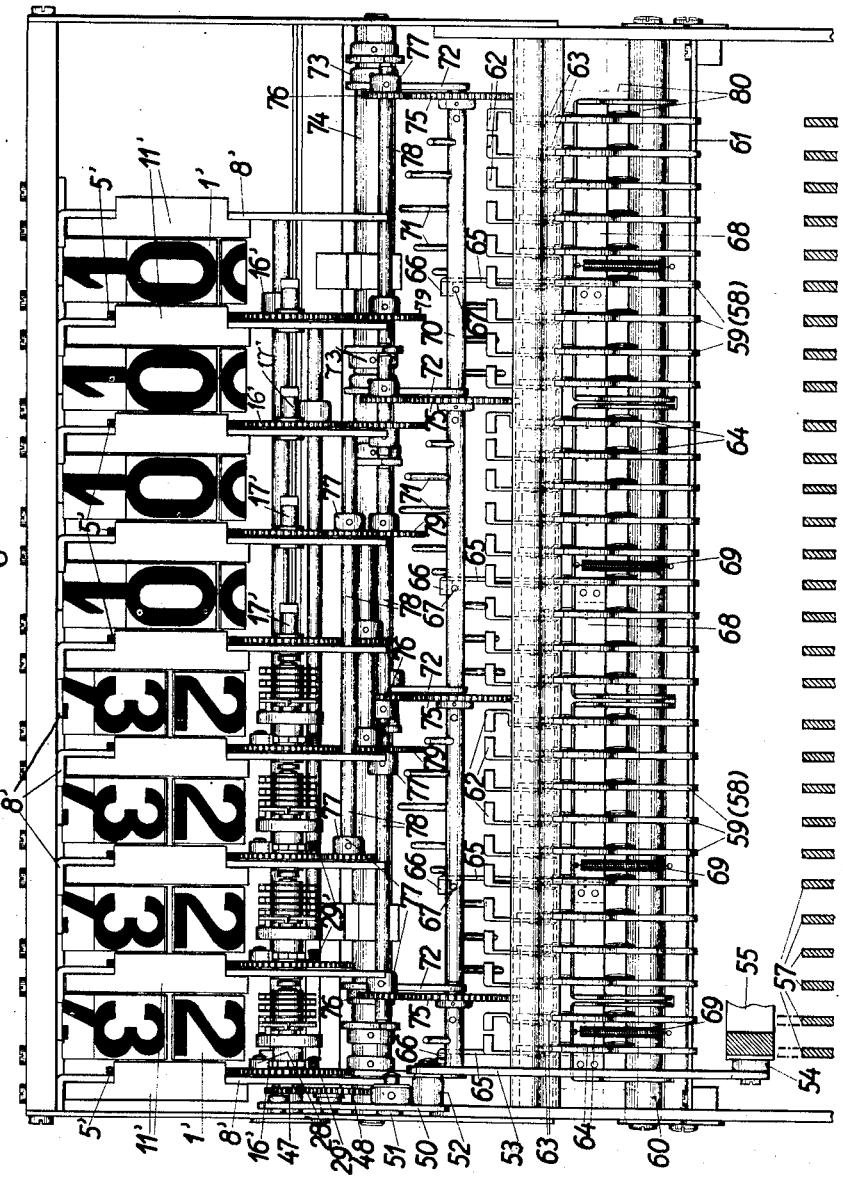

Nov. 10, 1953    K. AURBACH ET AL    2,658,668
INDICATING APPARATUS FOR CASH REGISTERS
OR OTHER BUSINESS MACHINES
Filed Oct. 17, 1950    10 Sheets-Sheet 8
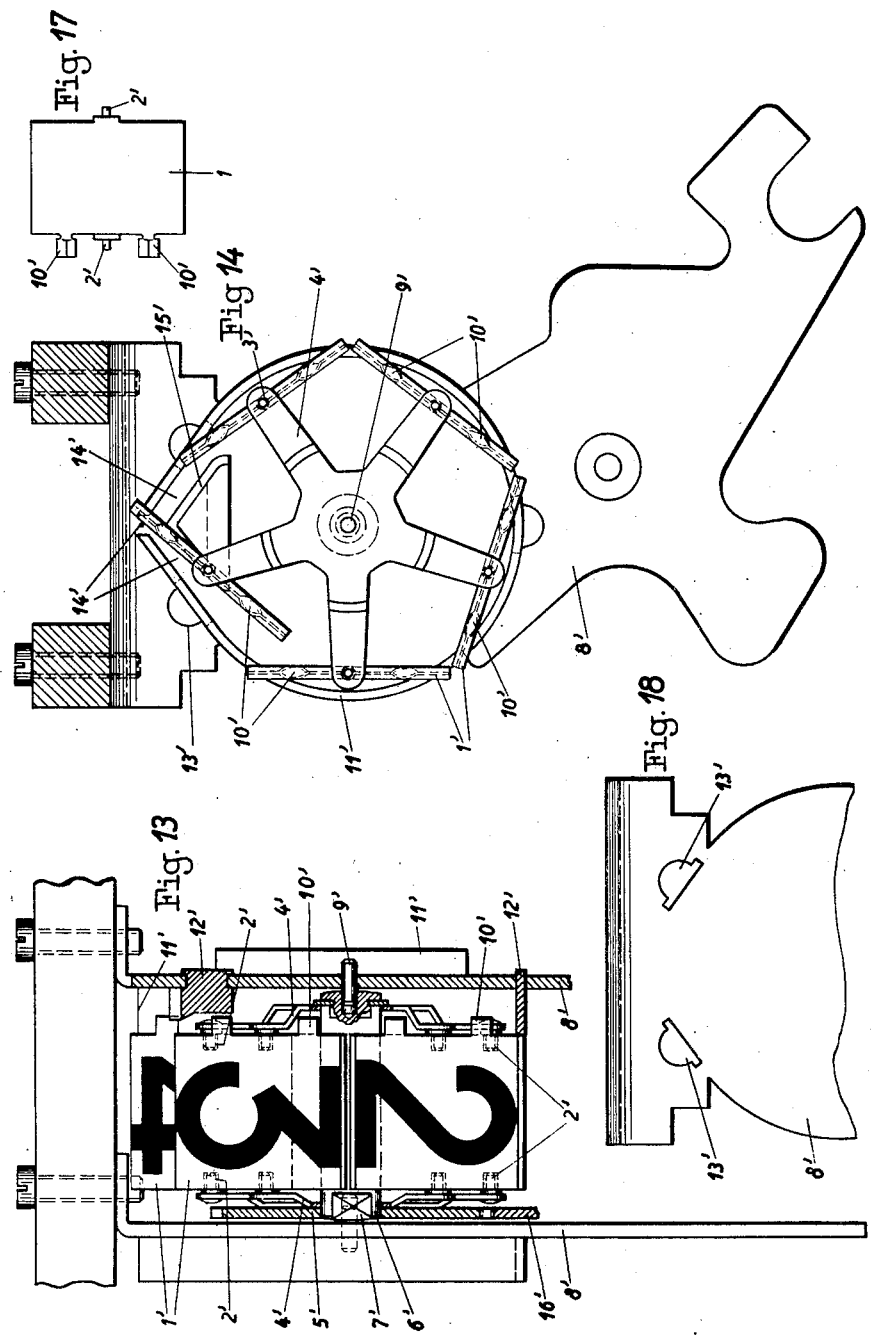
Inventors
Kurt Aurbach + Hans Schafer
By Knight Bros Attorneys

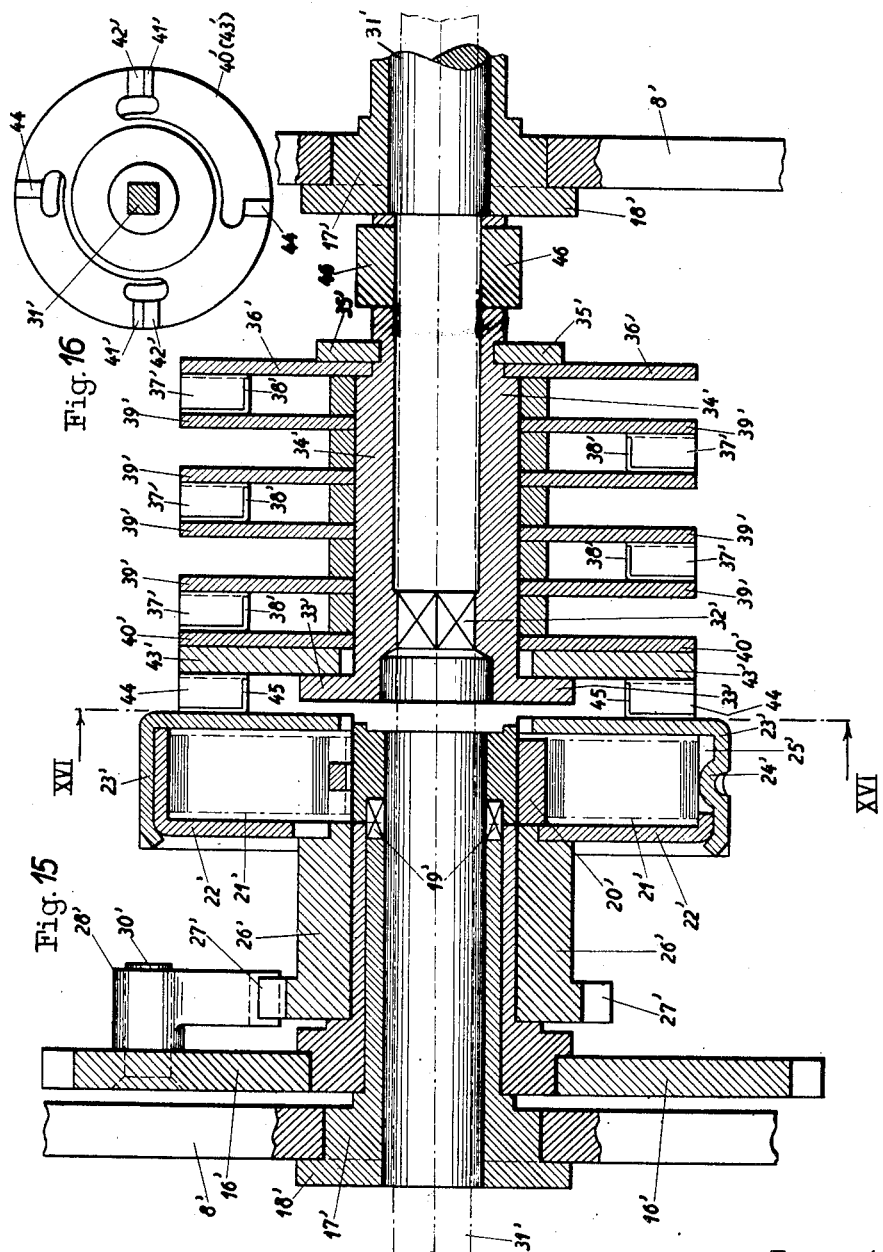

Inventors:
Kurt Aurbach
Hans Schaper

Patented Nov. 10, 1953

2,658,668

UNITED STATES PATENT OFFICE 2,658,668

INDICATING APPARATUS FOR CASH REGISTERS OR OTHER BUSINESS MACHINES

Kurt Aurbach and Hans Schaper, Bielefeld, Germany, assignors to Anker-Werke, A. G., Bielefeld, Germany, a corporation of Germany Application October 17, 1950, Serial No. 190,634

Claims priority, application Germany October 24, 1949

20 Claims. (Cl. 235—23)

Our invention relates to indicating apparatus for cash registers or other business machines such as calculating, bookkeeping and accounting machines. More particularly, the invention concerns business machine indicators which, for presenting large and easily readable characters, are equipped with character-bearing plate or flag-shaped indicator members.

It is an object of the invention to devise indicating apparatus of the above-mentioned type which afford an improved readability of large-sized indicator characters together with the advantages of optimum compactness and minimized overall space requirements.

Another object of the invention, relating especially to machines with lever type set-up keys, is to prevent the indicator apparatus from being detrimentally affected by impacts that might be transmitted thereto from the key levers and to make the operation of the indicator apparatus independent of variations in the force or pressure with which the machine keys are actuated.

According to one of the features of our invention, we equip an indicating unit for a cash register, accounting machine or the like with a number of selective indicator members smaller than the number of the various figures or other characters to be indicated and provide each of these members with a plurality of spacially separate characters. We further mount the indicator members of the unit on a movable carrier so that any one of them can be selectively placed into a given indicating location by correspondingly moving the carrier; and we make each of the members movable relative to the common carrier so that any one of the characters of each member can be selected for indication by correspondingly moving the member relative to the carrier.

According to another feature, more specific than the foregoing, the above-mentioned carrier is a rotatable structure and the individual indicator members mounted thereon are flat and plate shaped and carry two different numbers or characters on their two respective sides, a reversing or turning movement being imparted to each member relative to the carrier for selecting one or the other of the two characters.

By virtue of the above-mentioned features of the invention, the mass forces or inertial stresses occurring during the selective displacement or rotation of the carrier structure are reduced because of the reduced number of members to be moved, and the width and height of the unit and of the appertaining housing portion of the machine are likewise reduced in comparison with known apparatus of comparable size and readability of indication.

According to still another feature of the invention, we connect the set-up means or lever type keys of a cash register or the like machine with the various selective indicator members of an indicating unit by intermediate force means that are controlled by the keys but have an indicator actuating force independent of that applied to the keys. Consequently, the forces effective for selecting the one character of an indicator unit to be indicated, such as the one figure between 0 and 9 of a single digit of a multiple-digit amount, are determined by the characteristic of the intermediate force transmitting means so that any shock or impact acting on the keys or any differences caused by mechanical resistance in the multiplicity of key devices of an indicator unit are largely compensated as far as the operation and mass forces of the indicator unit are concerned.

While spring-force actuated indicator devices as such are known for cash registers with lever-type set-up keys, the spring in the known devices operates essentially an an elastic coupling, and the device is simply equipped with rotatable discs, one for each decimal digit. Each disc carries the figures 0 to 9 so that only one of them is visible depending upon the angular position of the disc. Since the figures of each disc have all a fixed position relative to one another, rather than being located on different surfaces of plate-shaped indicator members, there is no selection from among different indicator members within one and the same decimal digit as is the case in devices according to the invention, and the operating conditions are also different as regards mass forces and resistances.

The area available for each indicating character in the just-mentioned known devices is much smaller for any given overall dimensions than can be made available in apparatus according to the invention.

The foregoing and other objects, features and advantages of the invention will be apparent from the following description of the three embodiments of our invention illustrated on the drawings, in which Figures 1 to 6 show an indicating apparatus and the appertaining control means for a cash register, Figures 7 to 10 a modified form of an indicating apparatus, and Figures 11 to 18 a cash register with an indicating apparatus involving further modifications. More in detail:

Fig. 5 shows an indicator window of the apparatus as it appears from the customer's side; and Fig. 6 is a view similar to that of Fig. 2 but showing the illustrated parts in a different stage of operation;

Figure 11:
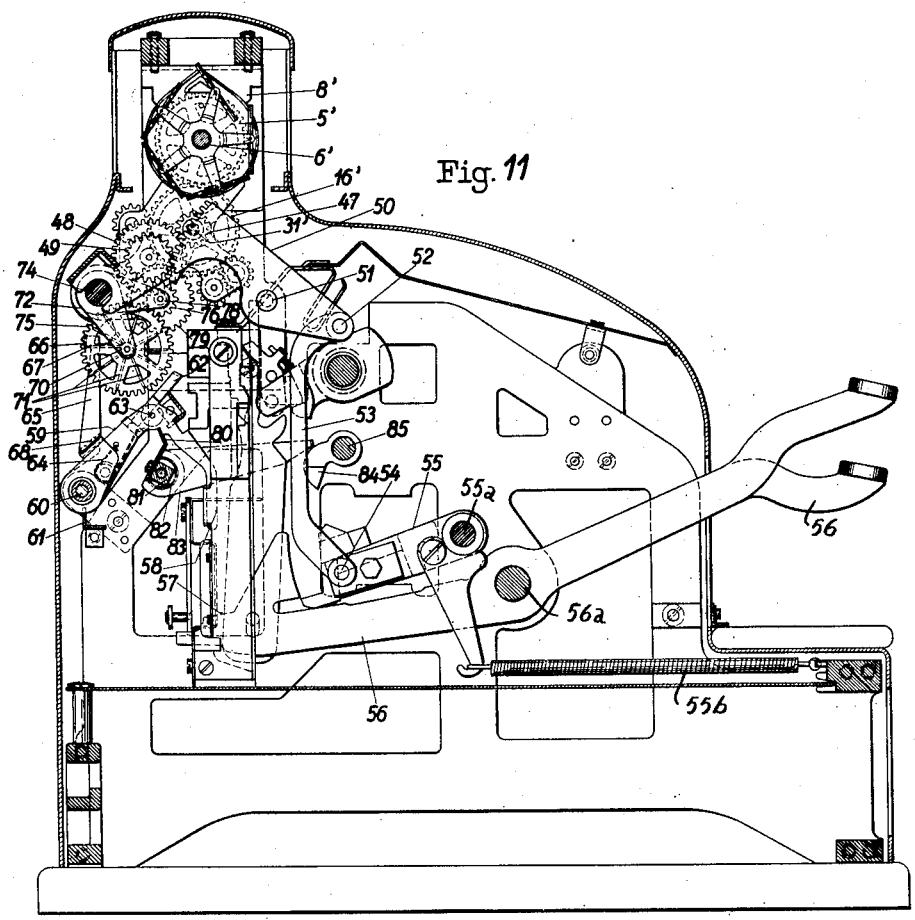

Fig. 7, relating to the second embodiment, shows schematically a bottom view of parts of an indicator unit, the plane of illustration corresponding to that indicated in Fig. 9 at VII—VII;

Fig. 8 is a similar bottom view of parts of the same unit, the viewed plane being indicated in Fig. 9 at VIII—VIII;

Fig. 9 is an axial sectional view of the unit according to the second embodiment;

Fig. 10 is a side elevation of the unit viewed from the same direction as Fig. 9;

Fig. 11, relating to the third embodiment, is a vertical section through a key lever type cash register;

Fig. 12 is a front view of the indicating apparatus of the same cash register;

Figs. 13 and 14 show, respectively, a part-sectional front view and a side view of one of the indicator units;

Fig. 15 is an axial section through a coupling and spring mechanism of the machine;

Fig. 16 shows details of coupling means appertaining to the mechanism of Fig. 15 seen from the left in a plane indicated in Fig. 15 at XVI—XVI; and Figs. 17 and 18 show details of respective elements of the indicator unit shown in Figs. 13 and 14.

Figure 19:
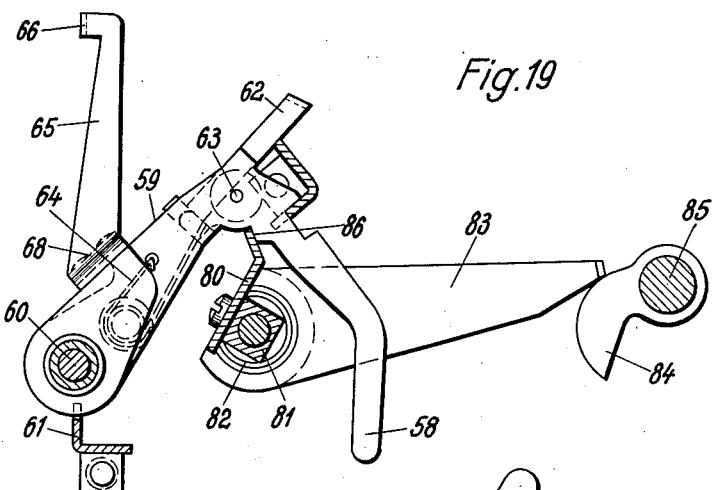
Figure 20:
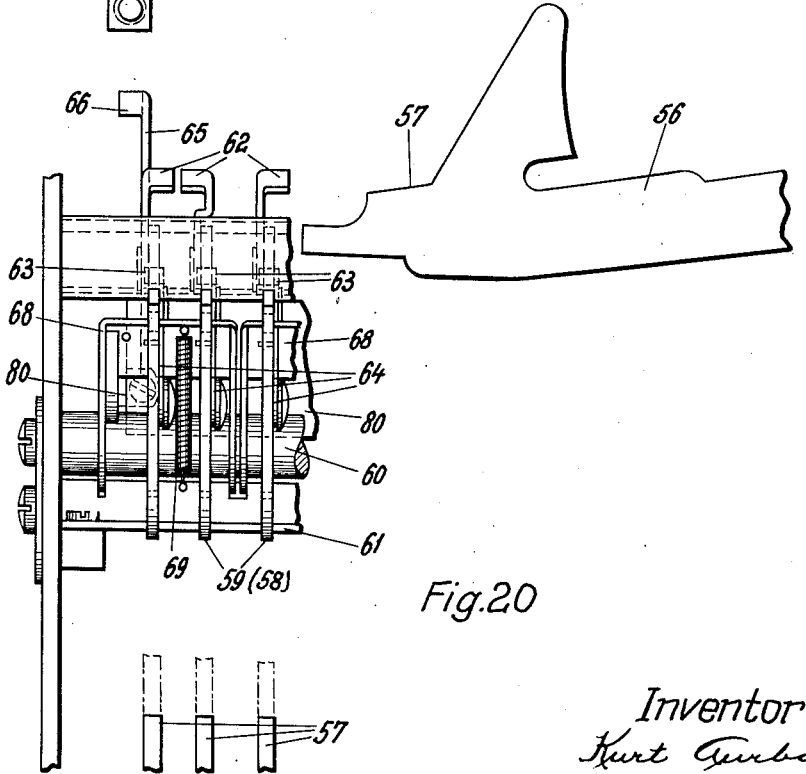

Fig. 19 shows separately and on a larger scale some of the elements illustrated in Fig. 11; and Fig. 20 shows similarly some of the elements illustrated in Fig. 12.

The apparatus illustrated in Figs. 1 to 6 serves to indicate the amount registered by a cash register and is designed for amounts of four decimal digits. The four-digit indication appears behind a window seen in Fig. 5 from the customer's side. A corresponding indication of the same four-digit amount appears at the cashier's or operator's side. Consequently, four digit indicator units A1, A2, A3, A4 (Fig. 4) are provided for the customer's side and four additional indicator units B1, B2, B3, B4 (Fig. 4) for the operator's side, each unit permitting the selection of a figure between 0 and 9. The units A1 and B1 are ganged together and simultaneously adjusted to show the same selected digit. The other indicator units A2—B2, A3—B3, A4—B4 at the customer's and operator's sides are correspondingly ganged in pairs, as more fully described in the following.

Figure 1:
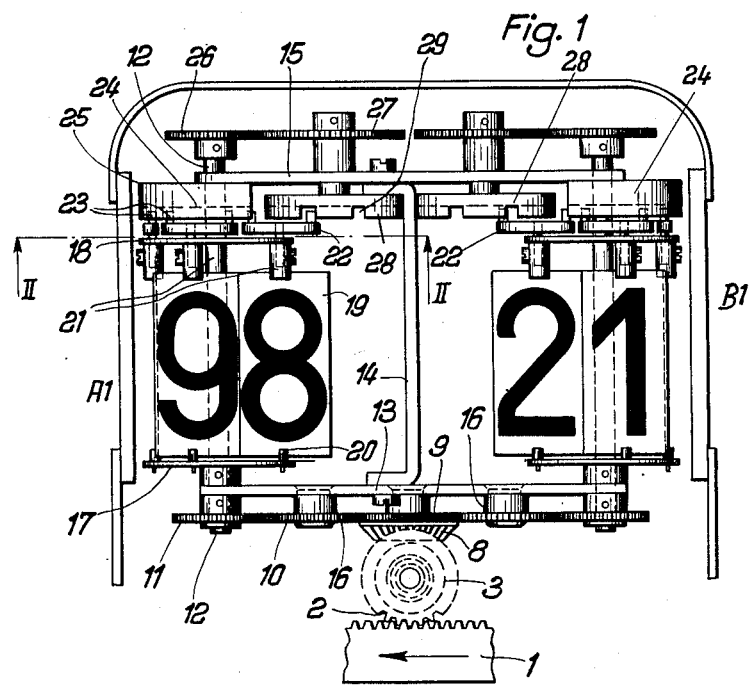
Figure 1 is a side elevation of an indicating apparatus with plate-shaped indicator members for the indication of digit numbers.
Figure 3:
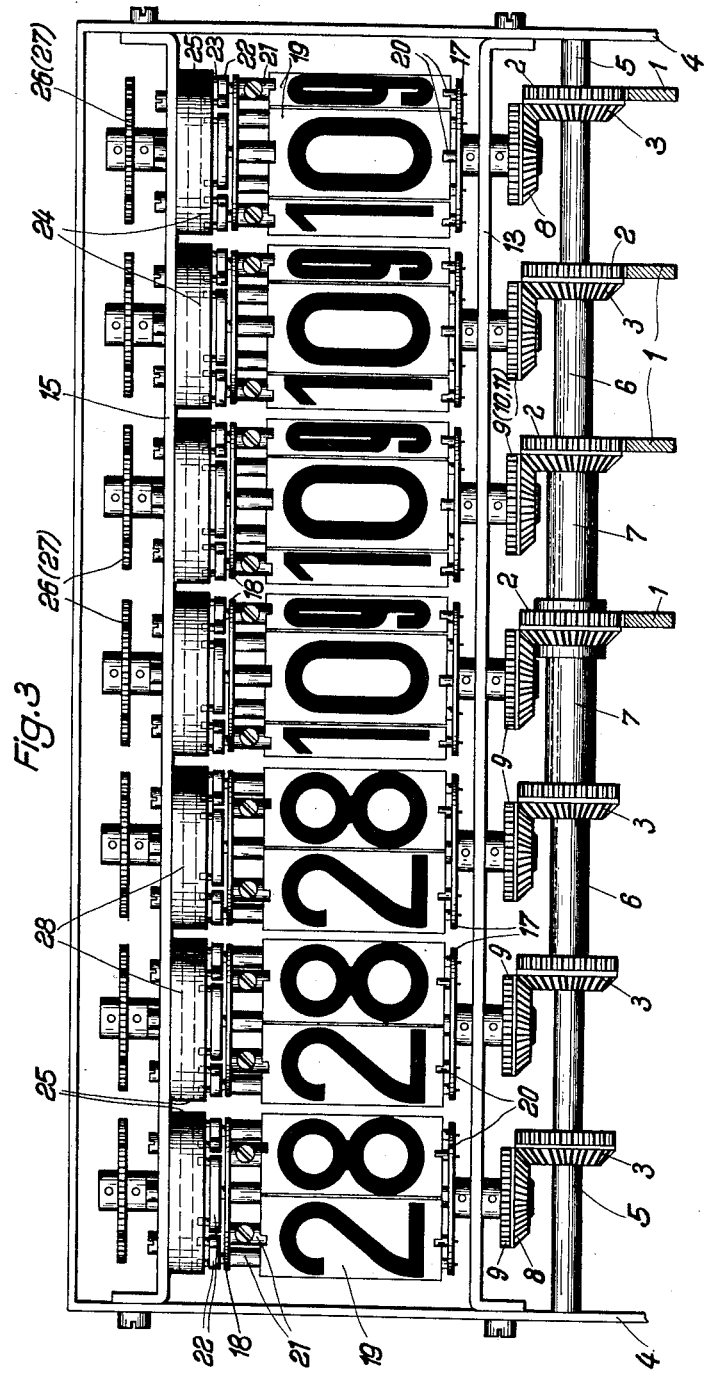
Fig. 3 is a front view of the indicating apparatus seen from the right (operator's side) of Fig. 1.
Figure 4:
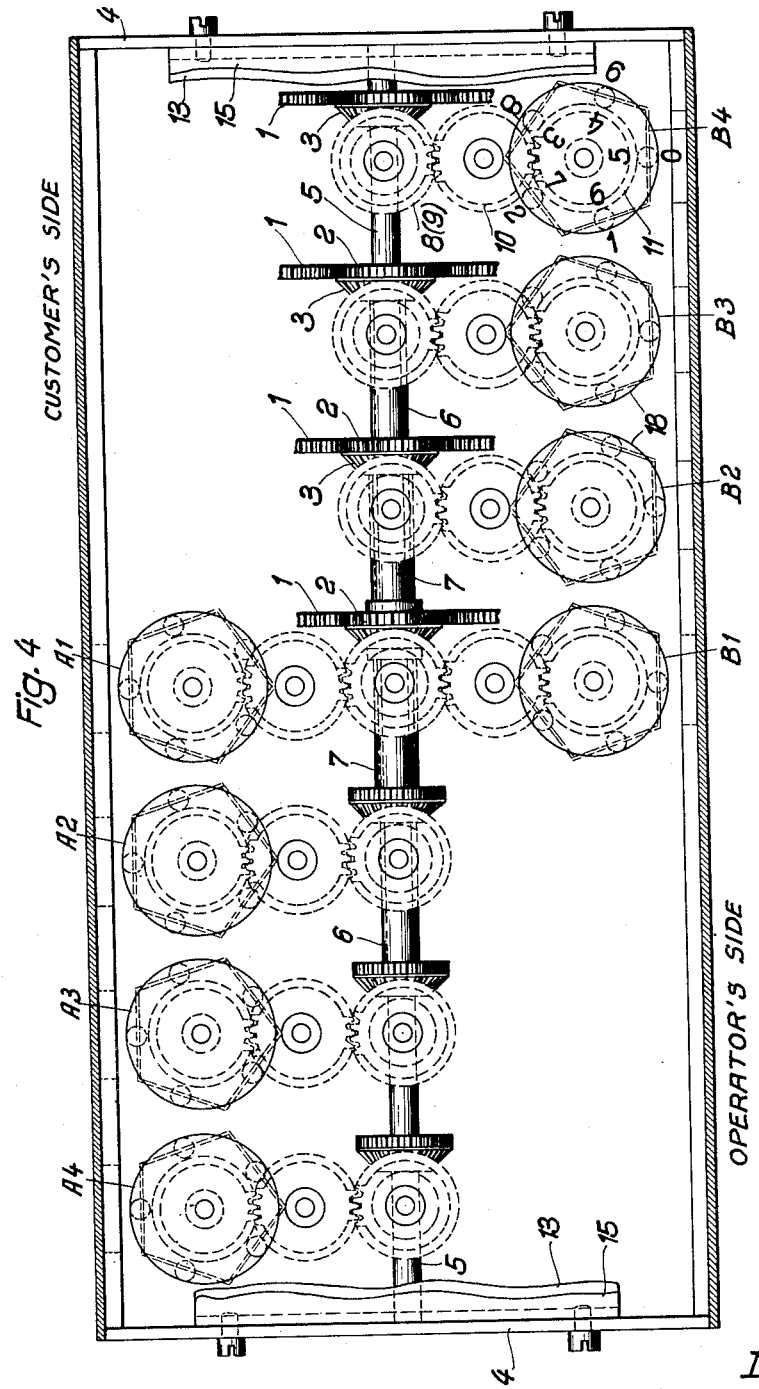
Fig. 4 is a top view of the apparatus.

For the four digits to be indicated, the machine has four respective control racks 1 (Figs. 1, 3, 4) which are longitudinally displaceable by the amount set-up means (not illustrated) of the machine and, as shown in Fig. 1, move to the left when adjusting the respective indicator devices from zero indication to any other figure to be selected. In each indicator unit on the operator's side, the rack 1 meshes with a spur gear 2 which is coaxially joined with a bevel gear 3 (Figs. 1, 3, 4) on a shaft 5 journalled in the side walls 4 of the machine frame structure. The two bevel gears 3 at the two ends of the shaft 5 are rigidly pinned thereto (Figs. 3, 4). The next inner two bevel gears 3 are rigidly joined together by a sleeve shaft 6 which is revolvable on shaft 5. The two next following bevel gears are similarly joined by a wider sleeve shaft 7 freely revolvable on shaft 6. The one remaining, centrally located bevel gear 3 is revolvably seated on sleeve shaft 7. Thus, each of the racks 1 controls two bevel gears 3 appertaining to corresponding digit indicating units at the operator's and customer's sides, respectively, with the exception of the centrally located rack 1 (Fig. 3) which controls only one bevel gear 3; but this one bevel gear transmits movement to the two directly opposite indicator units A1 and B1 at the two respective machine sides (Figs. 1, 3, 4).

Each digit indicator unit is linked with the appertaining bevel gear 3 by a gear transmission which has another bevel gear 8 in meshing engagement with gear 3 and is coaxially joined with a spur gear 9 (Figs. 1, 3, 4) that drives a shaft 12 through further spur gears 10 and 11. Shaft 12 is journalled in a frame structure composed of plates 13, 14, 15 (Figs. 1, 2, 3, 4, 6). Plate 13 carries bearing bolts 16 on which the spur gears 9 and 10 are revolvably mounted.

Rigidly secured to the shaft 12 of each unit are two discs 17 and 18 which are axially spaced from each other and serve as bearings for five flag or plate-shaped indicator members 19. Each plate 19 has two coaxial pivot pins 20 in revolvable engagement with the respective discs 17 and 18.

Both sides of each plate member 19 carry indicator characters. In the illustrated embodiment, for instance, the member 19 showing at one side the figure "0" carries on its other side the figure "5", an adjacent member 19 of the same indicator unit shows the figures "1" and "6" at its two sides, respectively, and the other three members carry the figures "2"—"7", "3"—"8", and "4"—"9" in a similar manner. Of course, only one of the two characters of each plate member is in visual position at a time, i. e. at the outside of the indicator unit; and the member must be turned about its pivot axis to place the other character into visual position, a corresponding rotary position of shaft 12 with discs 17, 18 being, of course, necessary to place the visual character of each member in the indicating location behind the indicator window.

Figure 2:
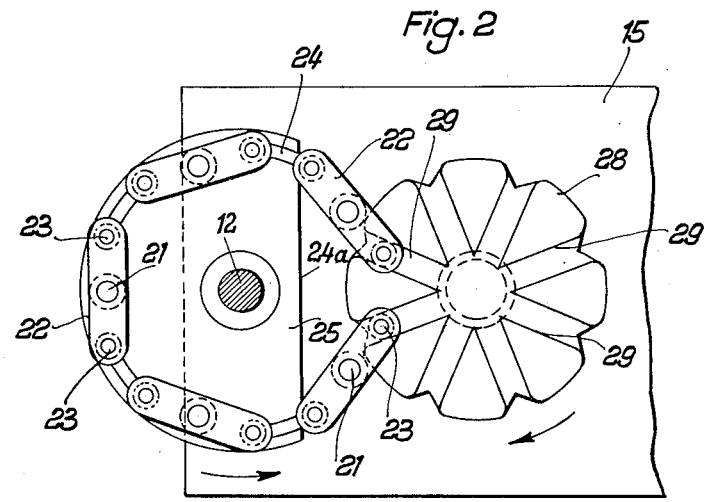
Fig. 2 is a partial bottom view of control means for the indicator members, the viewed plane being indicated in Fig. 1 at II—II.

For controlling the pivotal movement of the plate members 19, each of them carries on its pivot pin 21 a bar 22 with two mutually spaced dog pins 23 (Figs. 1, 2, 3, 6). The two pins 23 are slidably engageable with a part-circular groove 24 of a guide disc 25 rigidly secured to the plate 15 (Figs. 2, 6). Attached to the upper end of the shaft 12 is a spur gear 26 which meshes with a spur gear 27. Gear 27 is mounted on a shaft, journalled on plate 15, whose other end carries a grooved Geneva-gear-type cam disc 28. The pins 23, when outside the groove 24 of stationary disc 24 are engageable with radial grooves 29 of revolvable disc 28 to effect the operation described in the following.

When the amount or other control keys of the machine keyboard (not shown) are actuated, the racks 1 assume correspondingly adjusted positions, moving from their rest position in the direction toward the left as indicated by the arrow in Fig. 1. The gears 3 and 8 through 11, actuated by each displaced rack, turn the shaft 12 and the discs 17, 18 with the indicator members 19 a corresponding amount. Simultaneously, the grooved cam disc 28 is turned by spur gears 26 and 27 in the direction opposite to the movement of shaft 12 (Figs. 2, 6). When each rack 1 is in zero position and the appertaining indicator unit shows "0" in the indicator window, the other four indicator members of that unit have the figures "1," "2," "8," and "9" in visual, i. e. outside positions. If, for instance, the figure "4" is to be indicated, the rack 1 moves the distance needed to turn the appertaining shaft 12 four-fifths of a full rotation in the counterclockwise direction. During this rotation, the indicator member 19 previously showing the figure "8" is turned clockwise about its pivot axis by the Geneva type cam disc 28 so that it places the figure "3" into visual position. This pivotal reversing movement of the indicator member comes about as follows. When during the rotary movement of shaft 12, the leading dog pin 23 of a member 19 leaves the stationary guide groove 24 (Fig. 2), it is shortly thereafter caught in one of the grooves 29 of the then rotating Geneva cam 28 and then guided by that groove 29 to move away from shaft 12. The lagging dog pin 23 of the same member, as it emerges from stationary groove 24, is thus constrained to slide along the straight cam edge 24a of the stationary cam 25, thus turning the member 19 about its pivot axis through the transient position apparent from Fig. 6. While passing through that position, the previously lagging dog pin 23 becomes leading and the indicator member continues to pivot about its axis until its latter dog pin enters into groove 24. Thereafter, the other dog pin engages the groove 24 and the indicator member, now fully reversed, is again guided by groove 24; the next member, previously showing the figure "9" is reversed in the same manner so that its figure "4" is placed in visual position. Also the indicator member with the figure "0" is turned so that the figure "5" comes into appearance. However, a reversing of the remaining two indicator members carrying the figures "1" and "2" does not occur because the dog pins 23 of these two members remain within the stationary groove 24 and do not come into engagement with the Geneva cam 28. At the end of the four-fifths rotation of shaft 12, the figure "4" is placed in position behind the indicator window at the operator's side and, as explained, also at the customer's side.

It will be apparent that the selection of any figure to be indicated is effected by rotating the shaft 12 of the unit a corresponding number of steps, i. e. a corresponding number of fifths of one revolution.

The indicator unit illustrated in Figs. 7 to 10 has its shaft 12 journalled in a housing or frame structure composed of plates 30 and 31 which are joined together by spacer bolts 32 and screw nuts 33. The plate 30 has a large circular recess 34 merging with a relatively narrow radial slot 35. A guide prism 36 for the control of the indicator members 19 is disposed within recess 34 near slot 35. Mounted on shaft 12 is a star member 37 whose arm ends 38 are angularly bent and equipped with pivot embossments 39. Also mounted on shaft 12 is a star member 40 of spring steel whose arm ends are likewise equipped with pivot bosses 41. Each of the five indicator members 19 has two coaxial pivot points 42 in revolvable engagement with respective bosses 39 and 41 and is shaped to form two mutually spaced extensions 43.

The spur gear 11, when actuated by a corresponding adjustment of the amount set-up means of the machine, rotates the shaft 12 correspondingly. The star members 37, 40 and the indicator members 19 then rotate a corresponding amount. During this rotational movement, the edges of the indicator members 19 are guided along the periphery of the recess 34. As soon as any one of the indicator members 19 comes into the range of the prism 36 and of the slot 35, this member is caused to turn about its pivot points in the direction opposite the sense of rotation of shaft 12 so that the indicator member is reversed and the character previously located on its inner side turns to the outside to become visible when the member reaches the indicator window position.

The embodiment shown in Figs. 11 through 20 is designed as a cash register with lever type key members. The indicating device of this machine has indicator units whose individual indicator members 1' (Figs. 11, 13, 14, 17) have two coaxial pivot pins 2' journalled in pivot bores 3' of a star member 4' (Figs. 13, 14). One of the star members 4' is connected with a spur gear 5'. The parts 4' and 5' are placed on a shaft 6' which has squared surfaces 7' so that these parts rotate together with shaft 6'. The squared shaft is journalled between side walls 8' of the machine housing by means of bearing pins 9'. Pins 9' are secured to the side walls 8' and enter into respective bores of shaft 6' (Fig. 13). The indicator members are equipped with lugs 10' (Figs. 13, 17) to coact with a guide rail 11'. Rail 11' is attached to one of the side walls 8' by means of projections 12' which pass through rectangular openings 13' of the side wall 8' and are riveted to that side wall (Figs. 13, 18). The guide rail 11' is wide enough to project over the adjacent spur gear 5' (Fig. 12).

As in the preceding embodiments, each indicator member 1' is reversible and carries different characters on both sides, for instance, the figures 0—5, 1—6, 2—7, 3—8 and 4—9. The reversing control of the indicator members 1' of each unit is effected by means of a guiding groove 14' formed between the guide rail 11' and a prism 15' (Fig. 14). The prism 15' is preferably made of plastic or similar artificial material and is secured to the side wall 8'. The reversing operation occurs during the rotation of the indicator unit about its shaft 6', this rotation being controlled by the following devices.

In meshing engagement with the spur gear 5' on the shaft 6' of each unit is a spur gear 16' riveted to a bushing 17' (Figs. 11, 12, 15). Bushing 17' is revolvable on another bushing 18' which is rigidly connected with the side wall 8' (Fig. 15). Bushing 18' has a bayonet type lock 19' to cooperate with a drive member 20'. Secured to drive member 20' is one end of a torsionally effective spring 21' whose other end is attached to a housing portion 22'. A complementary housing portion 23' has a boss or the like projection 24' engaging a recess 25' of portion 22', thus coupling both housing portions together. The housing portion 22' is firmly secured to the hub 26' of a ratchet gear 27'. A pawl 28' coacts with ratchet 27' and is biased against it by a torsional spring 29' (Fig. 12). Pawl 28' is pivoted on a pin 30' (Fig. 15).

A shaft 31' which enters into the bushing

18' carries on its squared end 32' a bushing 34' with disc-shaped projection 33' (Fig. 15). Bushing 34' has a peripheral slot engaged by a spacing disc 35'. Firmly secured to the bushing 34' is a coupling disc 36'. Disc 36' has a bent projection or lug 37' to cooperate with a similar lug 38' of another coupling disc 39'. A total of four such coupling discs 39' are provided in each indicator unit. The lug 37' of the outermost left coupling disc 39', as shown in Fig. 15, coacts with the lug 38' of a disc 40' which has two lugs 41' opposite the last mentioned lug 38' (Fig. 16). The two lugs 41' act on two respective lugs 42' of a coupling disc 43' (Figs. 15, 16). Disc 43' has two lugs 44 which are displaced 90° relative to the lugs 42' and which in turn act upon two respective lugs 45 of the housing 23'. The just-described coupling means provide the possibility to wind up the above-mentioned spring 21' by rotating the housing 22', 23'. A spacer bushing 46 (Fig. 15) secures a proper distance between the bushing 33' and 18'.

Placed on the squared shaft 31' is a pinion 47 (Figs. 11, 12) which meshes with a spur gear 48. Rigidly connected with gear 48 is another spur gear 49 meshing with the rack portion of a driving segment 50. Segment 50 is mounted on a shaft 51 and is joined at 52 by a link 53 to a pivot 54 of a key connector member 55. The key connector member 55 is pivoted at 55a, biased by a spring 55b, and controlled by the keys 56 (Fig. 11) in the well known manner. Each key 56 has a projection 57 which, when in its active position, abuts against an extension 58 of a lever 59. All levers 59, one for each key, are aligned on a pivot shaft 60 and are axially spaced from one another by a spacer comb 61 (Figs. 11, 12). Each lever 59 has a pawl 62 pivoted at 63 and biased by a torsionally effective spring 64.

A separate zero stop lever 65 (Figs. 12, 19, 20) is provided for each digit of the amount to be indicated (penny, ten-penny, dollar and ten-dollar digits). Each lever 65 has a lateral lug 66 at its upper end to cooperate with a stop pin 67 (Figs. 11, 12). The zero stop levers 65 are riveted on bridges 68 which are likewise pivoted on the shaft 60 and are biased by springs 69 (Figs. 12, 20). The stop pins 67 (Figs. 11, 12) are mounted on respective shafts 70, a separate shaft being provided for each digit position. Each shaft 70 carries also a group of stop pins 71 engageable by the respective pawls 62. The shafts 70 are mounted between arms 72 which are secured to a shaft 74 by fastening bushings 73. Each shaft 70 carries a rigidly attached spur gear 75 which meshes with a pinion 76 whose hub 77 is firmly attached to transmission shaft 78. A separate shaft 78 is provided for each digit position and each of these shafts carries another spur 79 that meshes with the above-mentioned spur gear 16' of the appertaining indicator unit. In the present embodiment, as already indicated, amounts up to $99.99 can be set up and indicated, so that a total of four transmission shafts 78 are present. These shafts 78 effect the transmission of the digit indication to the four indicator units at the cashier's side as well as to the four corresponding indicator units at the customer's side of the cash register.

A locking rail 80 extends across all levers 59 for holding the levers 59 and hence the pawls 62 in their active positions (Figs. 11, 12). Rail 80 is mounted on a square shaft 81 and is biased by a torsionally effective spring 82 (Figs. 11, 19). Shaft 81 carries an arm 83 controlled by a cam 84 mounted on a cam shaft 85. The cam shaft 85 is caused to revolve during each machine operation, the revolution being imparted thereto from the key connector 55 so that, at the beginning of the key movement, the locking rail 80 swings at first counterclockwise and thereby releases the levers 59 to return from their active position under the bias of their respective springs 64 into the rest position shown in Figs. 11 and 19.

The operation of the described device is as follows:

At the beginning of the key movement for each digit, the corresponding movement of the key connector 55 about pivot shaft 55a is transmitted by link 53 to the driving segment 50 which rotates the spur gear 49 (Fig. 11). Gear 49 drives through gear train 48, 47 the squared shaft 31'. The bushings 34' on shaft 31' impart the movement through the coupling discs 36', 39' and 40' to the coupling discs 43' (Fig. 15), which, as described, turn the housing 23', 22', thus winding up the spiral spring 21'.

During the further course of the key movement, the cam 84 (Figs. 11, 19) presses upon the arm 83 and thereby turns the locking rail 80 counterclockwise about the axis of shaft 81. During the further movement of the key lever, the extension 57 of that lever abuts against the extension 58 of the corresponding lever 59 and turns the latter counterclockwise about its pivot shaft 60 (Figs. 11, 19). During this lever movement, the lug 66 at first releases the appertaining zero stop lever 65 with stop pin 67, while the corresponding pawl 62 moves into the range of the stop pins 71 (Figs. 11, 12). Due to the fact that the cam 84, immediately after its passage, releases the arm 83, arm 83 can return to its original position under the bias of its spring 82 (Fig. 19).

If the operator now releases the key lever, the extension 57 of the key lever moves free of the extension 58 of lever 59. Lever 59 now tends to return to the rest position but is prevented from moving by the locking rail 80 which is engaged by the projection 86 of lever 59. Consequently, pawl 62 of lever 59 remains within the range of the stop pins 71. By means of the springs 21' which are put under tension at the beginning of the key movement, the coupling gear 27' and the coupling pawl 28' (Fig. 15) now drive the spur gear 16' (Figs. 11, 12, 15) which turns the spur gear 5' of the appertaining indicator unit in the counterclockwise direction (Fig. 11). This has the effect of selecting the corresponding indicating member 1' and placing it into the visible indicating position. As mentioned, only five indicating plate members 1' are provided so that for each digit a selection of one of the figures between 0 and 9 must be made not only by rotating the indicator unit but, as the case may be, also by reversing one or several of the plate members. In the zero position of each indicator unit of this embodiment, the figures 5, 6, 7, 8 and 9 are located at the rear side of the indicator plate members 11 and, hence, when selected must be placed into the visible, exterior position by a reversing movement of the member. This movement comes about by the fact that during the rotation of the star member 4', one of the lugs 10' of a plate member 1' enters into the guiding groove 14' between the guide rail 11' and the prism 15' (Figs. 14, 17) and is so controlled by the groove that it imparts to the plate member 1' a reversing movement about the axis of the appertaining pivot pins 2'.

If for a new registration a previously depressed key lever is not again actuated but if instead another key is depressed, the locking rail 80, during its counterclockwise movement (Fig. 11), releases the corresponding lever 59. Then the zero stop lever 65 moves its lug 66 again into the range of the zero stop 67 while the pawl 62 is placed beyond the range of stop pins 71. Due to the action of the stressed spring 21', the indicator plate members are now turned, and the figure 0 will now appear behind the indicator window instead of the figure previously visible.

The above-described embodiments of the invention will suffice to show that the invention permits of various modifications in design and arrangement, and it will be obvious to those skilled in the art upon a study of this disclosure that modifications, embodiments and uses other than those specifically referred to are readily available without departure from the essence of the invention and within the scope of the claims annexed hereto.

We claim:

1. Indicating apparatus for cash registers, calculating machines, accounting machines and the like business machines, comprising a rotatable carrier structure having a plurality of peripherally distributed indicator members selectively movable to a given indicating position by rotation of said structure, each of said members being substantially plate shaped and having respective front and back faces with different characters, and each of said members being individually and reversibly pivoted on said rotatable carrier structure for selection of one of said two characters to be indicated.

2. Indicating apparatus for business machines, comprising a housing having an indicator window, a rotatable carrier structure disposed in said housing and having a plurality of peripherally distributed and plate-shaped indicator members selectively movable to an indicating position behind said window, said members being substantially plate-shaped and having respective front and back faces with respectively different characters to be indicated, said members being reversibly pivoted on said carrier for selection of one of its two characters to be indicated, drive mechanism means connected with said carrier structure for rotating said structure, and reversing means engageable with said members and disposed in said housing at a place near the rear of said carrier as seen from said window for reversing each member as it passes by said means during rotation of said carrier.

3. Indicating apparatus according to claim 1, comprising Geneva type cam means located at a place along the path of carrier rotation and successively engageable with said individual members to reverse them as they pass by said cam means during rotation of said carrier structure.

4. Indicating apparatus according to claim 1, comprising a substantially spool shaped housing journalling said carrier structure and having guide means engageable with said members along the path of carrier rotation for controlling the position of said members relative to said carrier structure.

5. Indicating apparatus according to claim 1, comprising stationary guide means extending along part of the path of carrier rotation and being engageable with said members for maintaining them in proper positions relative to said carrier structure, and reversing means individually engageable with said members at a place outside the range of said guide means to reverse said members as they pass along said place during rotation of said carrier structure.

6. Indicating apparatus according to claim 1, comprising control arms secured to said respective members, a stationary guide means extending along the path of carrier rotation, and Geneva type cam means for reversing said members disposed partially in said path but outside the range of said guide means, said arms being engageable with said guide and with said cam means.

7. Indicating apparatus according to claim 1, comprising stationary guide means extending along part of the path of carrier rotation and being engageable with said members for maintaining them in proper positions relative to said carrier structure, a revolvable Geneva type cam gear disposed outside the range of said guide means and engageable with said members, and transmission means connecting said carrier structure with said cam gear to revolve said gear during rotation of said structure for reversing said members as they pass by said gear.

8. Indicating apparatus for business machines, comprising a rotatable carrier structure having a plurality of peripherally distributed indicator members selectively movable to a given indicating position by rotation of said structure, each of said members having respective front and back faces with respectively different characters exhibited thereon and being reversibly pivoted on said carrier structure for selection of one of said two characters to be indicated, stationary guide means extending substantially around the path of carrier rotation and being in engagement with said individual members for controlling their pivotal position relative to said carrier structure during rotation of said structure, said guide means having at one location of said path a stationary cam contour shaped for reversing said members as they pass along said location.

9. Indicating apparatus according to claim 8, comprising a stationary guide prism engageable with said members and forming part of said guide means, said prism being located at said location for reversing said members.

10. In indicating apparatus according to claim 8, said guide means comprising a stationary structure having a substantially circular recess coaxial with said carrier structure, and said indicator members being substantially plate-shaped and each having two edges parallel to its pivot axis and oppositely spaced from said pivot axis, said two edges of each member being slidable with said stationary structure along said recess.

11. Indicating apparatus for business machines, comprising a rotatable carrier structure having two axially spaced star-shaped members with radially extending arms, a plurality of indicator plates each being reversibly pivoted at axially opposite points on two respective arms of said star members, and each having respective front and back faces with respectively different characters to be indicated, guide means surrounding the path of carrier rotation and engaged by said plates for controlling their pivotal position relative to said carrier structure during rotation of said structure, said guide means having at one locality a plate reversing cam contour.

12. In indicating apparatus according to claim 11, one of said star-shaped carrier members having its arms angularly bent and projecting axially toward said other star-shaped carrier member, and each of said indicator plates having two mutually spaced axially projecting portions forming an intermediate recess, said bent arms of said one carrier member extending into said recesses and being pivotally joined with said plates in said respective recesses.

13. In indicating apparatus according to claim 11, one of said star-shaped carrier members being elastically resilient toward said other carrier member, and said indicator plates being loosely pivoted to said carrier members to be secured thereto by spring bias due to resiliency of said one carrier member.

14. In indicating apparatus according to claim 1, said carrier structure having a horizontal axis of rotation, and said indicator members having respective horizontal axes of revolution.

15. With indicating apparatus for cash registers and similar business machines comprising rotatable indicator means, operator-actuatable register-setting control means, force storing transmission means disposed between said indicator means and said control means, in combination, said transmission means comprising a shaft, a housing rotatable on said shaft, a spring in said housing attached to said shaft and said housing for tensioning by relative rotation between shaft and housing, a step-up gear transmission connecting said shaft with said control means so as to impart a plurality of revolutions to said shaft during each actuation of said control means, and mechanism means connecting said housing with said indicator means for causing said spring when tensioned to rotate said indicator means.

16. Indicating apparatus for business machines with selectively depressable key means comprising a plurality of indicator units, one for each position of a composite indication, each of said units having a movable character-carrying structure, a force storing transmission having two relatively movable elements and a spring interconnecting said elements to be tensioned by relative movement thereof, motion transmitting means connecting said key means with one of said elements for imparting to said element a spring tensioning movement during depressing movement of said key means, mechanism connecting said other element with said structure and having releasable locking means normally stopping said other element, and releasing means controlled by said key means for releasing said other element at the beginning of the return movement of said key means to then release said other element to rotate said structure by stored force of said spring.

17. Indicating apparatus according to claim 16, comprising a separate position control shaft for each of said indicator units, gear means interconnecting said control shaft and said unit, said shaft having a plurality of angularly displaced stop elements, a corresponding plurality of selector levers actuable by said control means and engageable with said respective stop elements to stop said structure in a position depending upon the selected actuated control means, said shaft having a single zero stop element, and a single zero stop lever for each of said respective units engageable with said zero stop element for determining the zero position of said structure of said unit.

18. Indicating apparatus according to claim 16, comprising a separate position control shaft for each of said indicator units, gear means interconnecting said control shaft and said unit, said shaft having a plurality of angularly displaced stop elements, a corresponding plurality of selector levers actuable by said control means and engageable with said respective stop elements to stop said structure in a position depending upon the selected actuated control means, said shaft having a single zero stop element, a single zero stop lever for each of said respective units engageable with said zero stop element for determining the zero position of said structure of said unit, and mechanism means interconnecting said zero stop lever and said selector levers of each unit for moving said zero stop lever into inactive position when any one of said selector levers is actuated.

19. Indicating apparatus for cash registers, calculating machines, accounting machines and the like business machines, comprising a rotatable carrier structure having a vertical axis of rotation and having a plurality of peripherally distributed indicator members selectively movable to a given indicating position by rotation of said structure, each of said members being substantially plate-shaped and having respective front and back faces with different characters to be indicated, and each of said members having on said carrier structure a vertical pivot axis and being individually and reversibly movable on said structure about said pivot axis for selection of one of said two characters to be indicated.

20. Indicating apparatus for key-lever controlled cash registers or the like, comprising a plurality of indicator units, one for each position of a composite indication, each of said units having a movable carrier structure and having a plurality of indicator members reversibly pivoted on said carrier structure, manually operable selective control means each capable of reciprocating motion, a force-storing transmission disposed between each of said control means and each of said respective units, each of said transmissions having a spring connected with one of said respective control means to be tensioned by the forward stroke of said control means, stop means engageable with said transmission means and connected with said control means for releasing said spring during the return stroke of said control means, said transmission being connected with said carrier structure for moving said structure to place one of said indicator members of said structure into a given indicating position due to force released by said spring.

KURT AURBACH.
HANS SCHAPER.

References Cited in the file of this patent

UNITED STATES PATENTS

| Number | Name | Date |
|---|---|---|
| 455,111 | Osborn | June 30, 1891 |
| 880,632 | Creelman | Mar. 3, 1908 |
| 1,804,650 | Shipley | May 12, 1931 |
| 1,936,927 | Arnold | Nov. 28, 1933 |
| 2,124,697 | Handley | July 26, 1938 |
| 2,154,495 | Dahlberg | Apr. 18, 1939 |
| 2,279,456 | Friden et al. | Apr. 14, 1942 |
| 2,279,805 | Werner | Apr. 14, 1942 |
| 2,328,272 | Gubelmann | Aug. 31, 1943 |
| 2,458,850 | Hardick | Jan. 11, 1949 |